United States Patent
Plumb et al.

(10) Patent No.: US 9,754,582 B2
(45) Date of Patent: Sep. 5, 2017

(54) IDENTIFYING A CONTACT

(71) Applicant: Microsoft Technology Licensing, LLC, Redmond, WA (US)

(72) Inventors: Graham Plumb, London (GB); Mark Swift, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 14/180,957

(22) Filed: Feb. 14, 2014

(65) Prior Publication Data

US 2015/0142442 A1 May 21, 2015

(30) Foreign Application Priority Data

Nov. 18, 2013 (GB) .................................. 1320334.4

(51) Int. Cl.
| | |
|---|---|
| *G10L 13/08* | (2013.01) |
| *G10L 15/08* | (2006.01) |
| *G10L 15/22* | (2006.01) |
| *G10L 17/22* | (2013.01) |
| *G06F 17/27* | (2006.01) |

(52) U.S. Cl.
CPC .............. *G10L 15/08* (2013.01); *G06F 17/27* (2013.01); *G10L 15/22* (2013.01); *G10L 17/22* (2013.01)

(58) Field of Classification Search
CPC .............................. G10L 13/08; G06F 17/2705
See application file for complete search history.

(56) References Cited

U.S. PATENT DOCUMENTS

| | | | |
|---|---|---|---|
| 5,946,691 A * | 8/1999 | Lee et al. | |
| 6,314,165 B1 * | 11/2001 | Junqua | G10L 15/26 379/216.01 |
| 6,411,932 B1 * | 6/2002 | Molnar et al. | 704/260 |
| 7,333,966 B2 | 2/2008 | Dozier | |
| 7,467,087 B1 * | 12/2008 | Gillick | G10L 15/26 704/235 |
| 7,822,598 B2 * | 10/2010 | Carus | G06F 17/2735 704/1 |
| 8,190,538 B2 * | 5/2012 | Zhang | G06F 17/30985 706/12 |
| 8,433,762 B1 | 4/2013 | Wald et al. | |
| 8,583,418 B2 | 11/2013 | Silverman et al. | |
| 2004/0002850 A1 * | 1/2004 | Shaefer et al. | 704/5 |
| 2004/0145762 A1 * | 7/2004 | Kurashina | B41J 3/4075 358/1.11 |

(Continued)

OTHER PUBLICATIONS

"International Search Report and Written Opinion", Application No. PCT/US2014/065597, Mar. 4, 2015, 24 Pages.

(Continued)

*Primary Examiner* — Michael N Opsasnick
*Assistant Examiner* — Bryan Blankenagel

(57) ABSTRACT

A method of identifying a contact in a communication system using voice input, the method comprising: receiving an input string of characters, the input string representing a contact and being normally unpronounceable by a human voice when spoken literally; performing at least one transforming step to transform at least one character of the input string to thereby generate a pronounceable name for the contact; and outputting the pronounceable name for use in establishing a communication event with the contact using voice input.

21 Claims, 5 Drawing Sheets

(56) References Cited

U.S. PATENT DOCUMENTS

| | | | |
|---|---|---|---|
| 2005/0177369 A1* | 8/2005 | Stoimenov | G10L 13/08 704/260 |
| 2005/0216503 A1* | 9/2005 | Charlot | G06Q 50/22 |
| 2007/0027673 A1* | 2/2007 | Moberg | 704/9 |
| 2007/0162284 A1* | 7/2007 | Otani | G10L 13/08 704/260 |
| 2007/0290878 A1* | 12/2007 | Maggio | G06Q 30/02 340/4.37 |
| 2008/0046824 A1* | 2/2008 | Li et al. | 715/739 |
| 2008/0080687 A1* | 4/2008 | Broms | H04M 1/72536 379/142.02 |
| 2008/0120102 A1* | 5/2008 | Rao | 704/235 |
| 2008/0208574 A1* | 8/2008 | Chen | G10L 13/08 704/221 |
| 2009/0319521 A1* | 12/2009 | Groeneveld | G06F 17/30864 |
| 2010/0049518 A1* | 2/2010 | Ferrieux | G10L 19/0018 704/254 |
| 2010/0082349 A1* | 4/2010 | Bellegarda et al. | 704/260 |
| 2010/0260399 A1* | 10/2010 | Hajnal | G06F 19/321 382/131 |
| 2010/0267367 A1* | 10/2010 | Booth | H04M 1/274516 455/414.1 |
| 2012/0065979 A1 | 3/2012 | Wong et al. | |
| 2012/0262461 A1* | 10/2012 | Fisher et al. | 345/467 |
| 2013/0006613 A1* | 1/2013 | Karov Zangvil | G06F 3/0237 704/9 |
| 2013/0197906 A1 | 8/2013 | Varkey et al. | |
| 2013/0231917 A1 | 9/2013 | Naik | |

OTHER PUBLICATIONS

Beaufays, "Learning Name Pronunciation in Automatic Speech Recognition Systems", Proceedings 15th IEEE Intl. Conference on Tools with Artificial Intelligence. Sacramento, CA., Nov. 3, 2003, pp. 233-240.

Li, "Adapting Grapheme-To-Phoneme Conversion for Name Recognition", Automatic Speech Recognition & Understanding, 2007. ASRU. IEEE Workshop on, IEEE, PI,, ISBN: 978-1-4244-1745-2, pp. 130-135.

Xue, "Normalizing Microtext", Analyzing Microtext 11:05., Jan. 1, 2011 (Jan. 1, 2011), XP055171754,, Retrieved from the Internet: URL:http://www.researchgate.net/profile/Brian_Davison/publication/221603856_Normalizing_Microtext/links/00b4951e732d911d99000000.pdf, 2011, 6 Pages.

"L337 (LEET) Converter", Retrieved From: <http://www.brenz.net/services/l337Maker.asp> Nov. 21, 2013, Jan. 15, 2013, 1 Page.

Jay, "L33t Translator", Retrieved From: <http://www.jayssite.com/stuff/l33t/l33t_translator.html> Nov. 20, 2013, Apr. 17, 2013, 1 Page.

Topkara, et al., "Information Hiding Through Errors: A Confusing Approach", In Proceedings of the SPIE International Conference on Security, Steganography, and Watermarking of Multimedia Contents, Feb. 26, 2007, 12 Pages.

"Second Written Opinion", Application No. PCT/US2014/065597, Nov. 3, 2015, 7 pages.

Adda, "Text Normalization and Speech Recognition in French", In Proceedings of ESCA Eurospeech, Sep. 22, 1997, 4 pages.

"International Preliminary Report on Patentability", Application No. PCT/US2014/065597, Feb. 5, 2016, 8 pages.

* cited by examiner

IDENTIFYING A CONTACT

RELATED APPLICATIONS

This application claims priority under 35 USC §119 or §365 to Great Britain Patent Application No. 1320334.4 entitled "Identifying a Contact" filed Nov. 18, 2013 by Plumb et al., the disclosure of which is incorporate in its entirety.

BACKGROUND

A contact's identification on services such as Skype and Xbox Live often consists of metadata like a username, gamertag, nickname, first name, surname, or combinations thereof. Some user communities actually encourage a degree of "digital anonymity" in contact names, for example the moniker "S0meG1rl" is intended to be pronounced as "Some Girl", but is unpronounceable if read literally. This presents a challenge for software attempting to use speech recognition to easily identify a contact without a high degree of (tangential) user interaction.

Communication systems attempt to address this by doing one (or more) of the following: force users to enter additional pronounceable metadata; ignore difficult looking names or do nothing so that names entered as, for example, "Chr1s" are simply not useable in voice recognized commands.

SUMMARY

The subject matter pertains to a method. The method is a method of identifying a contact in a communication system using voice input. The method comprises receiving an input string of characters, the input string representing a contact and being normally unpronounceable by a human voice if spoken literally. The method further comprises performing at least one transforming step to transform at least one character of the input string to generate a pronounceable name for the contact. The pronounceable name is output for use in establishing a communication event with the contact using voice input.

The subject matter also pertains to a corresponding computer readable medium and a user device.

This summary is provided to introduce a selection of concepts in a simplified form that are further described in the Detailed Description below. This summary is not intended to identify key features of the claimed subject matter, nor is it intended to be used to limit the scope of the claimed subject matter.

DESCRIPTION OF DRAWINGS

For a better understanding of the present disclosure and to show how the same may be put into effect, reference will now be made, by way of example, to the following drawings in which.

DETAILED DESCRIPTION

In the present disclosure, transformation of name data and monikers to first name, surname and nicknames (where appropriate) allow for a more natural identification of a contact using voice input. By maintaining a score (quality parameter) for each step in a transformation, confidence in the resulting data may be inferred.

A transformation process is a series of discrete sanitization operations which modify the input string source representing name data (be it full name, first name, moniker etc.) in an attempt to remove common patterns of complexity and ambiguous string components in order to generate a pronounceable name.

The transformation process may implement transformation steps carried out on an input string representing name data/monikers for a contact to attempt to interpret "leet speak". "Leet speak" is the substitution of letters with numbers and symbols in a contact's name. For example, the aim would be to transform "S0meG1rl" to the pronounceable word "Some Girl".

Each transformation step returns a result that contains the source name data, transformed data and the number of character changes or removals undertaken. The output of each transformation is then chained to the input of the next transformation until all steps are complete and a final result is ascertained.

The result can then be used to calculate a score (quality parameter) based on the size of the original text, and the cumulative transformations that have been undertaken upon it, allowing for evaluation against a quality threshold. The approach will not entirely mitigate the issue of incorrect pronunciation of complex monikers (such as, for example, Xbox Live gamertags), but will go some way to improving its likelihood.

In one embodiment, the output of these steps is intended to be used as part of a speech recognition system's grammar, so there will not be a visual component (the user will experience on the display the original source text). However, in other embodiments, the pronounceable name is outputted to the display and displayed in association with the input string. In some embodiments, the pronounceable name may be outputted to the display in editable form as an autosuggested replacement for the input string.

Optionally, the sanitization operations of the transformation process are based on a contact's region. This may allow for cultural differences in, for example, "leet speak", contact titles and/or honorifics. It should be noted that each step of the transformation process may perform regional sanitization.

Figure 1:
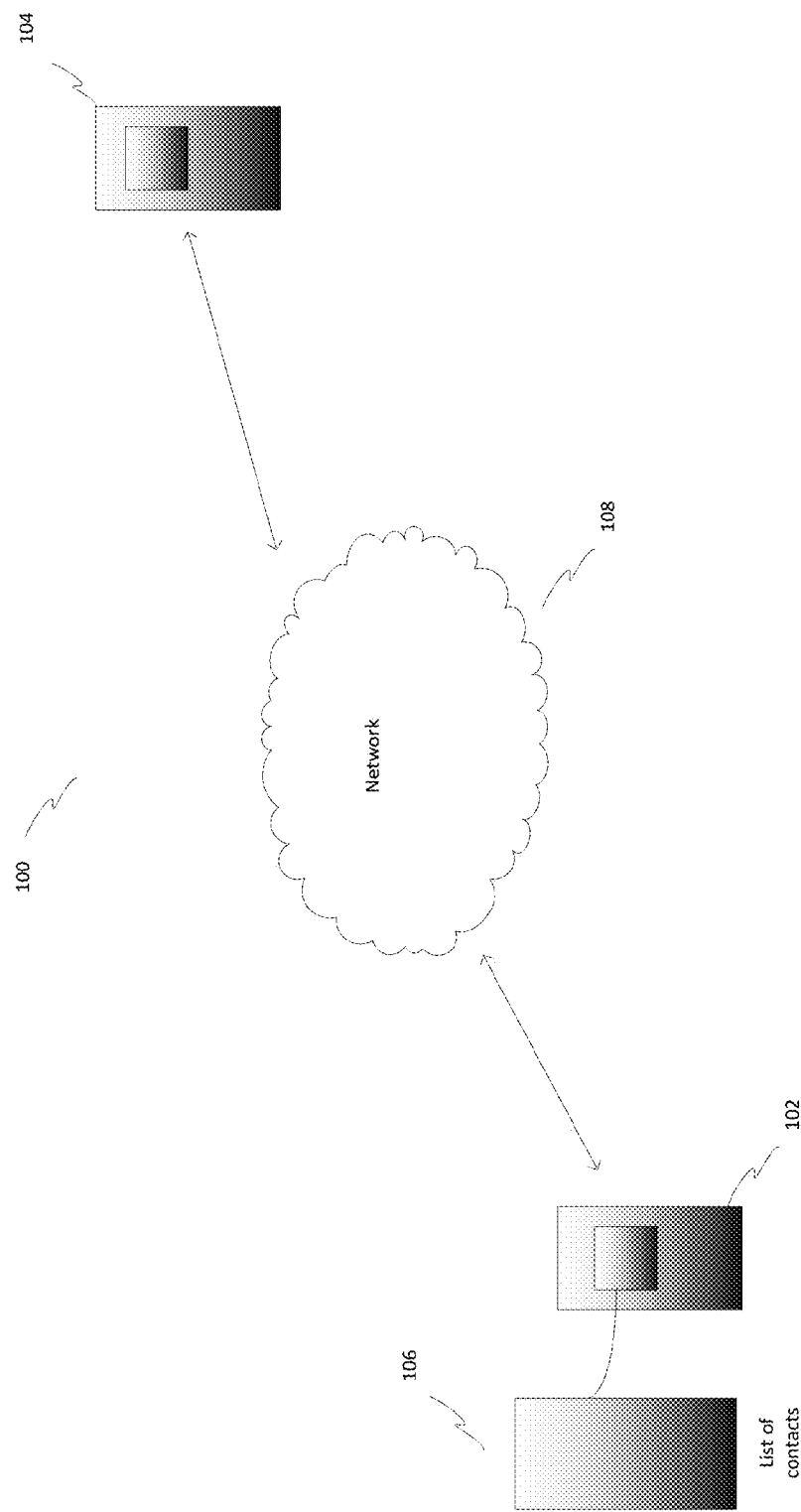
FIG. 1 shows a schematic illustration of a communication system.

FIG. 1 shows a general communication system 100 comprising a first user terminal 102 associated with a first user (User A, not shown) and a second user terminal 104 associated with a second user (User B, not shown). Whilst only two user terminals have been shown in FIG. 1 for simplicity, the communication system 100 may comprise any number of users and associated user devices. The user terminals 102 and 104 can communicate over the network 108 in the communication system 100, thereby allowing the users A and B to communicate with each other over the network 108. The network 108 may be any suitable network which has the ability to provide a communication channel between the first user terminal 102 and the second user terminal 104. For example, the network 106 may be the Internet or another type of network such as a High data rate mobile network, such as a 3$^{rd}$ generation ("3G") mobile network. The user terminal 102 may be, for example, a mobile phone, a personal digital assistant ("PDA"), a personal computer ("PC") (including, for example, Windows™, Mac OS™ and Linux™ PCs), a gaming device or other embedded device able to connect to the network 108. The user terminal 102 is arranged to receive information from and output information to the user of the user terminal 102. In one embodiment the user terminal 102 comprises a display such as a screen and an input device such as a keypad, a touch-screen, and/or a microphone. The user terminal 102 is connected to the network 108.

Each user terminal 102 and 104 may use a contact list to store the contact details of other user terminals associated with other users. For example, in the general communication system shown in FIG. 1, user terminal 102 associated with User A uses a contact list 106. The contact list 106 could store contact information of other users with which User A may wish to establish a communication event, for example the contact list could store the contact details of user terminal 104 associated with User B. The contact information could be, for example, a telephone number, an email address, an IP address etc. The contact list 106 associates a contact's identification with their contact information. The contact's identification could be, for example, the name of the contact, a username, their gamertag, a nickname or combinations thereof.

The contact list is accessible by User A in order to enable User A to establish a communication event with a user stored on the list. For example, the contact list may be capable of being displayed on a graphical user interface of the user terminal. The user could then select a relevant contact from the displayed contact list in order to establish a communication event with the terminal of the selected contact. The contact list could also be accessed via a voice input from the user. For example, the user could pronounce the name of a contact on the contact list and the user terminal could process this voice input to select the relevant contact from the contact list and establish a communication event with the associated user terminal.

Figure 2:
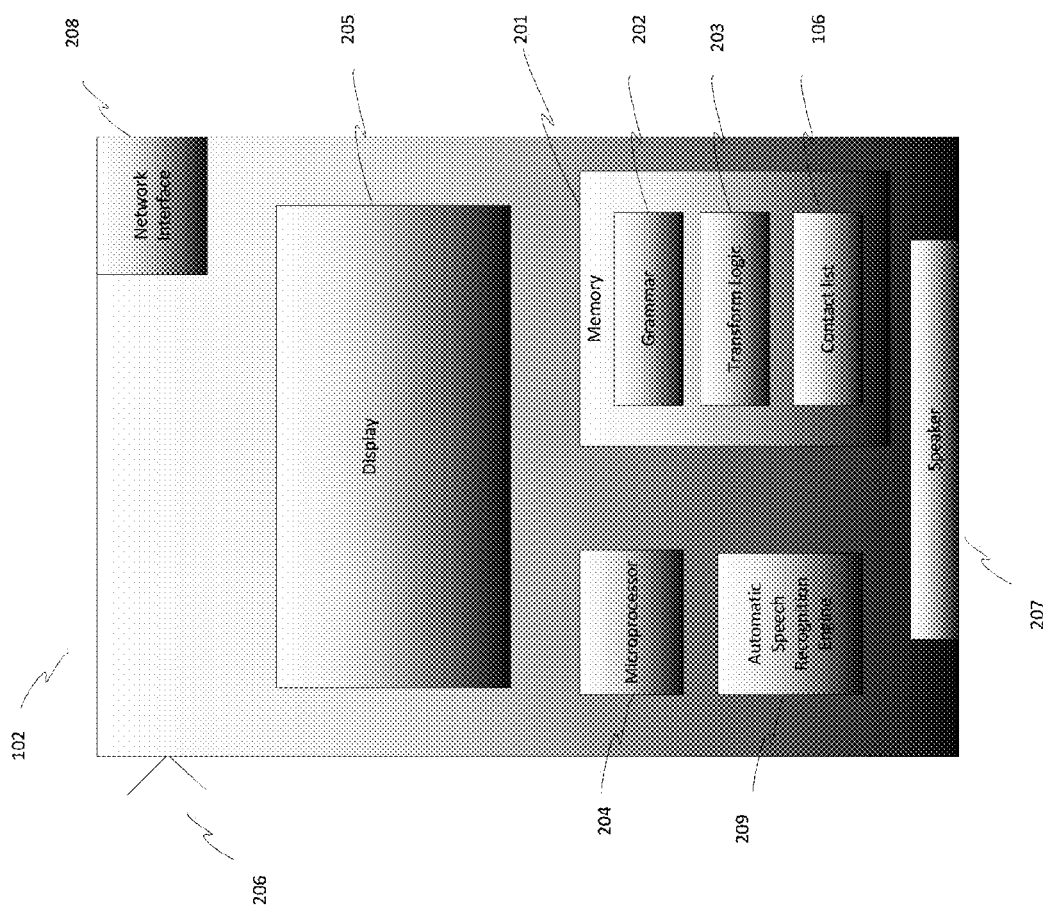
FIG. 2 shows a schematic illustration of the operative components of a user device.

FIG. 2 illustrates a view of the operative components of a user terminal 102. It should be noted that as used herein like reference numerals represent like components/elements. The user terminal comprises a microprocessor 204 connected to a display 205 such as a screen or touch screen. The processor is further connected to an audio input device 206 (e.g. a microphone) and an audio output device 207 (e.g. a speaker). The display 205, audio input device and audio output device may be integrated into the user terminal 102 as shown in FIG. 2. In alternative user terminals one or more of the display, audio input and audio output may not be integrated into the user terminal 102 and may connect to the microprocessor via respective interfaces. The microprocessor is connected to a network interface 208 such as a modem for communication with the network 108. The network interface 208 may be integrated into the user terminal 102 as shown in FIG. 2. In alternative user terminals the network interface 208 is not integrated into the user terminal 102. The microprocessor is further connected to an Automatic Speech Recognition (ASR) engine 209. The user terminal 102 comprises a memory 201 having stored thereon a Grammar 202, transform logic 203 and the contact list 106. The Grammar is connected to the ASR engine 209. The memory 201 may be a permanent memory, such as ROM, or may alternatively be a temporary memory, such as RAM.

The ASR engine 209 is coupled to the microphone 206 and is configured to receive from the microphone an input audio signal, such as a voice signal generated from a user speaking into the microphone. The ASR engine is configured to analyse the input audio signal to determine if speech can be recognised and whether that speech represents an instruction from the user.

The ASR engine determines whether speech can be recognised by accessing the Grammar 202. For example, the user may speak into the microphone to instruct the user terminal to call a contact from the contact list 106, such as User B. The microphone will generate from the user's instruction an audio signal. The ASR engine will analyse this signal by accessing the Grammar, and if it recognizes the name of the contact spoken by the user (in this case User B), it will output a signal to trigger the user terminal 102 to call terminal 104 associated with User B.

In some instances the contact list contains contacts whose identification is not pronounceable when read literally by a human. Such an example is the "leet speak" described above. Contact names written in "leet speak" can be written in such a way that, although not pronounceable when read literally, can nevertheless be understood when read by a human. Referring to the earlier example above, the moniker "S0omeG1rl" can be understood as "Some Girl" when read by a human even though the moniker itself it not pronounceable.

Maintaining this example, if User A speaks into the microphone of terminal 102 to request the terminal to call "Some Girl" (intending for terminal 102 to call the terminal associated with the contact "S0meG1rl"), the ASR engine will recognise this speech, but will not be able to trigger the user terminal 102 to call the desired terminal because there is no contact identifier on the contact list 106 under the name "Some Girl". In these instances the ASR engine may not be successful in using speech recognition to identify a contact.

Figure 3:
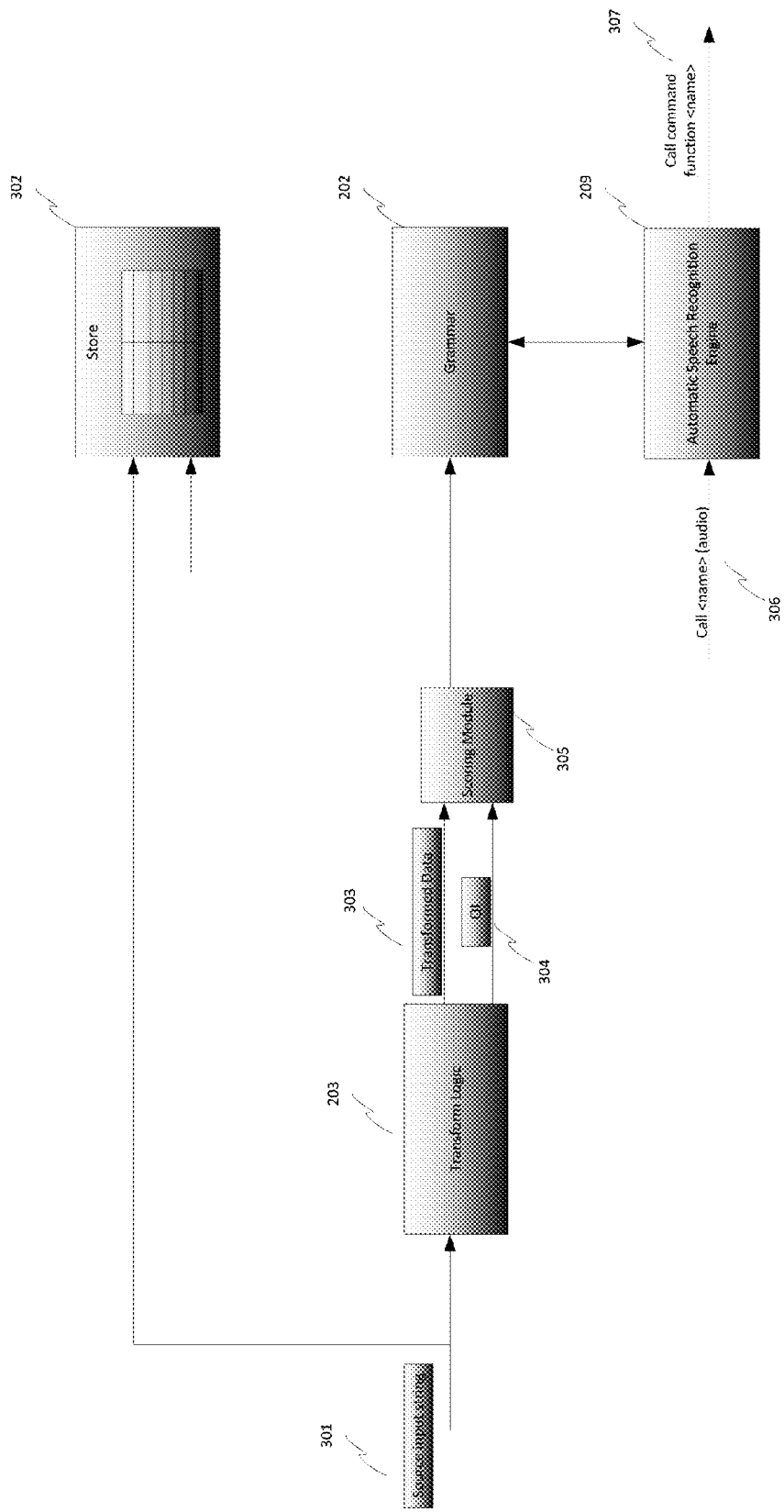
FIG. 3 shows a schematic illustration of the functional modules of a user device for identifying a contact using voice input.
Figure 4:
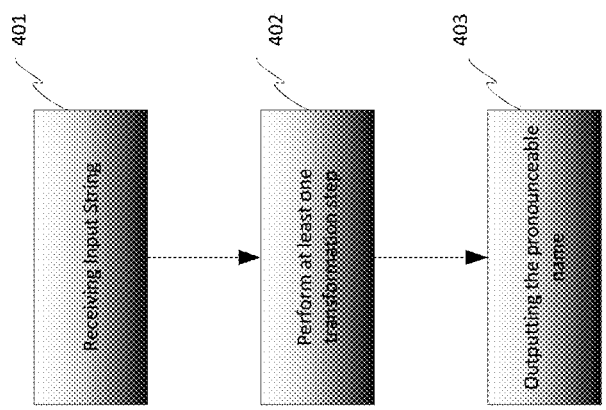
FIG. 4 shows a flow chart of a method of identifying a contact using voice input.

Referring to FIGS. 3 and 4 there is described a method for transforming an input string into a human-pronounceable word or name. The input string could be, e.g., name data or a moniker, or be written in "leet speak". The input string could represent a contact's identification for use within a contact list.

FIG. 3 shows an input string 301 which is received at an input of the transform logic 203 and a store module 302. The transform logic has an output configured to output transformed data 303, which could be a word pronounceable by a human voice. The transform logic 203 is configured to perform the transformation process from the input string to the transformed data. As will be described in more detail below, the transformation process could comprise multiple transformation steps which modify the input string in an attempt to remove common patterns of complexity and ambiguous string components. Each of these steps could be implemented by the transform logic 203.

In one embodiment the transform logic is a software program executed on a local processor in the user terminal, such as processor 204. The transform logic may have an input configured to receive an input string, and an output configured to output transformed data.

Further output from the transform logic is Quality Indicator (QI) 304 which is a score used to evaluate the quality of the transformation. The score can be calculated based on the size of the original input string and the transformations that have been undertaken on it to produce the transformed data.

If the transformation process comprises multiple transformations steps, the QI can be calculated as a function of a calculated result for each of the transformation steps. For example, each transformation step could return a result that contains the input string (for that step) and information relating to the degree of transformation between the input string and the transformed data for that step, such as the number of character changes undertaken to transform the input string into the transformed data, and/or the number of characters removed from the input string. The output of each transformation step is then chained to the input of the next transformation step until all the transformation steps are complete and a final result is calculated. The QI is then calculated from the final result.

A scoring module 305 is configured to receive the output transformed data and the QI. Based on the value of the QI, the scoring module can determine whether to discard the transformed data 303 or to output the transformed data for addition to the Grammar 202. For example, the scoring module could compare the calculated score QI to a quality threshold. If the score is below the threshold, the transformed data is discarded; if the score is above the threshold, the transformed data is added to the Grammar 202.

In one embodiment the scoring module is a software program executed on a local processor of the device, such as processor 204.

Further shown in FIG. 3 is the ASR engine 209 which is configured to be able to access the Grammar 202. The ASR engine is configured to receive as an input an audio signal 306 (such as an audio signal output from the microphone 206) and to output a command function 307 for triggering the user device to perform an operation based on the input audio signal. The audio signal could be a command to, for example, call, email or message a contact from the contact list 106.

In one embodiment, the source input strings are a contact's identification from a user's contact list 106 stored on a user terminal 102. In this embodiment the output transformed data 303 could be a human-pronounceable name or word that is associated with the contact's identification. Referring to our earlier example, the contact's identification could be the moniker "S0meG1rl". In this example the source input string is data representing this moniker and the output transformed data could be data representing the pronounceable name "Some Girl". If the transformed data is of sufficient quality the name "Some Girl" would be added to the Grammar 202 to be associated with the moniker "S0meG1rl".

With reference to FIG. 4 there is described a method of identifying a contact from the contact list using a voice input.

At step 401 a source input string 301 is received at transform logic 203. The input string is a contact's identification from the contact list 106. The transform logic could be configured to receive the input string from the memory 201 of the user device which stores the contact list 106. The contact's identification could be written in leet speak or be a moniker, and as such be unpronounceable by a human voice if spoken literally.

At step 402 at least one transformation step is performed on the input string to transform at least one character of the input string. The at least one transformation step is performed by the transform logic 203. During each transformation step, characters of the input string are transformed, e.g. by substitution or by deletion, in order to remove characters of the input string that contributed to the string being unpronounceable by a human voice.

After completion of the at least one transformation step, the unpronounceable input string has been transformed into a pronounceable name for the contact's identification. The pronounceable name is output from the transform logic 203 in step 403 as transformed data.

In one embodiment, the transformed data is input into a scoring module 305 to evaluate the quality of the transformed data, as described above. In this embodiment, if the scoring module determines that the transformed data is of sufficient quality (e.g. compared to a threshold quality), the transformed data is input into the Grammar 202 of the user terminal. If the transformed data is not of sufficient quality, it is discarded and not input into the Grammar.

In an alternative embodiment, the transformed data is output from the transform logic into the Grammar without evaluating its quality. That is, all transformed data output from the transform logic will be input into the Grammar.

By inputting the transformed data into the Grammar 202, the contact's identification is then associated with a pronounceable name. If the user terminal receives a voice input from the user which contains the pronounceable version of a contact's identification, the ASR engine will be able to access the Grammar 202 to recognise the pronounceable name and determine that it is associated with a contact's identification from the contact list. Based on the command input by the user, the ASR engine can then output a message to trigger the user terminal to take an appropriate action. For example if the voice input command was "Call 'Some Girl'", the ASR engine would access the Grammar to recognise the name "Some Girl" and identify that this name is associated with the identification "S0meG1rl" from the contact list 106. The message output from the ASR engine would then trigger the user terminal to call the contact "S0meG1rl".

In one embodiment, the source input string identifying the contact from the contact list is output to the display 205 of the user terminal. For example, a message may be output to the display to inform the user that the displayed source input string is going to be transformed into a pronounceable name. Alternatively a message may be output to ask the user whether they wish for the displayed source input string to be transformed into a pronounceable name, and to provide the user with the option of not proceeding with the transformation if they do not wish to do so.

Alternatively or in addition, a message may be output to the display of the user terminal once the at least one transformation step has been performed on the source input string to display the transformed data to the user. This message could contain both the source input string and the associated transformed data. For example, a message could be output to inform the user that the source input string has been transformed into a human-pronounceable word. This could make the user aware that the pronounceable word has been added to the Grammar and will be recognised by the ASR engine. In another embodiment, the transformed data could be output to the display of the user terminal in the form of an editable autosuggestion. This could allow the user to edit the transformed data if the input string has been transformed incorrectly, for example because the transformed data is not pronounceable.

As described above, the transformation performed by the transform logic 203 to transform the source input string to the transformed output data could comprise more than one transformation step. In one embodiment, the operations performed by the transform logic in a transformation are as follows:

Replace accents: This step changes accented characters to their base equivalents where regionally acceptable (for example, the transformation of a to a is an acceptable transformation in UK English but not in French).

Strip symbols: Remove inappropriate symbols such as, for example, © and ™.

Change separators to whitespace: This step removes characters in the input string such as dashes, underscores, hyphens and other adjoining symbols.

Trim leading/trailing numbers and symbols: This step removes any leading or trailing numbers from the input string (e.g. Mark23 to Mark).

Replace double vowel leet characters: This step transforms double-vowel leet characters into their appropriate equivalents, for example 00 to oo, 33 to ee etc.

Replace single vowel leet characters: This step changes leet characters that exist within a run of characters, optionally evaluating preceding characters. For example, this step would transform: Simon to Simon, Alan to Alan, Mich@el to Michael etc.

Strip initials: This step removes single characters that end with a period or whitespace, for example Joe M Bloggs transforms to Joe Bloggs.

Normalize capitalisation: This step detects runs of characters where name fragments are combined and only distinguishable by capitilisation. This may occur in, for example, gamertags. Once detected, this step inserts whitespace to separate the name fragments, e.g. JohnPaulSmith is transformed to John Paul Smith.

Parse suffixes, titles, nicknames and fullname: This step parses any suffixes or titles (e.g. Mr, Mrs, PhD etc.) and classifies them against a known list. The left-over characters are then parsed into a first name (the first token in the string, that is, the first series of contiguous characters without a line break) and a full name (the entire string, once whitespace has been compacted).

Figure 5:
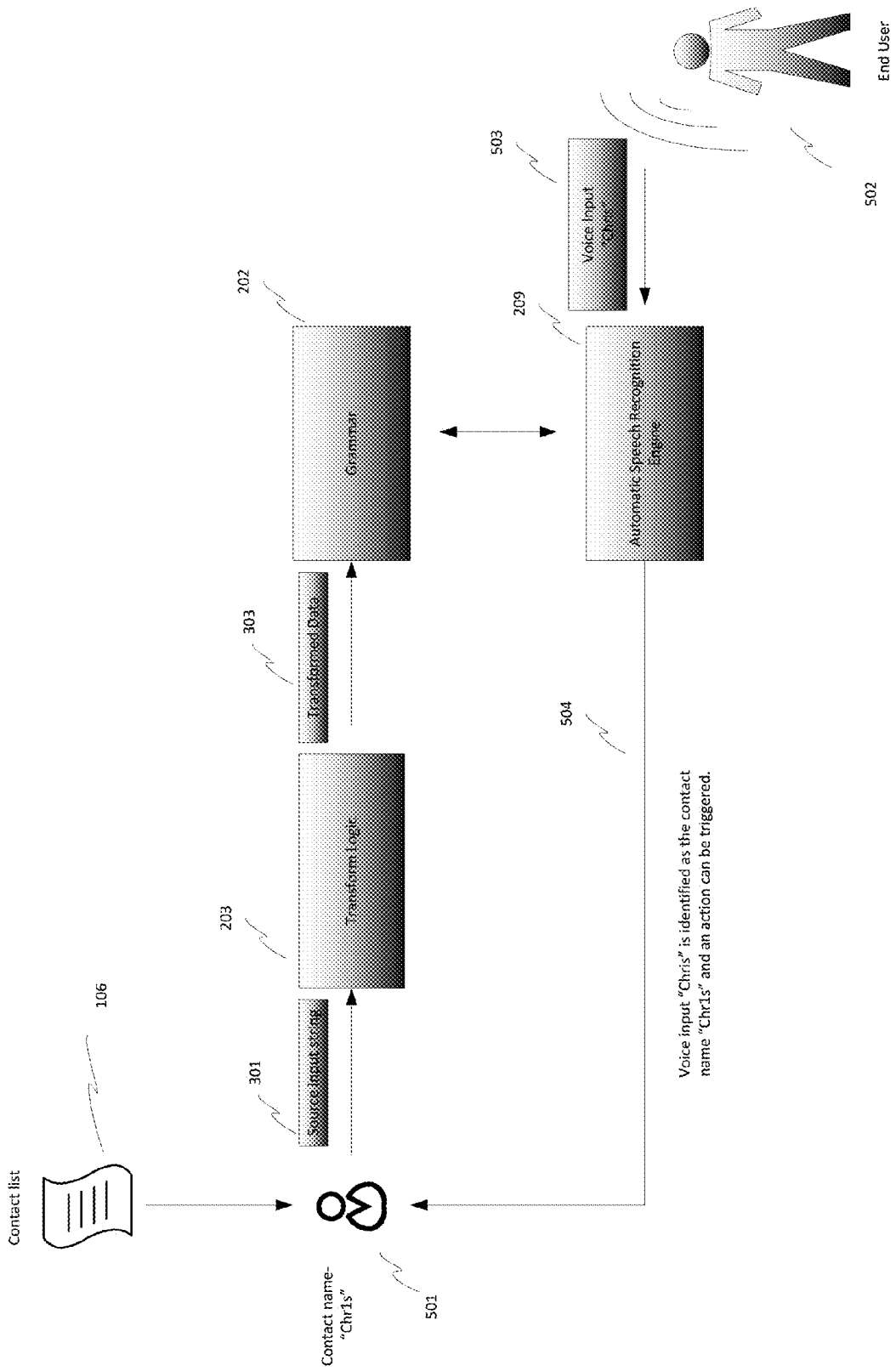
FIG. 5 shows a further schematic illustration of the functional modules of a user device for identifying a contact using voice input.

FIG. 5 is a schematic diagram to illustrate the modules of a user device for identifying a contact in a communication system using a voice input.

FIG. 5 shows a contact list 106 which stores details of contacts of an end user 502. The contact list could be stored on a user terminal, such as terminal 102, which is operable by end user 502. Each contact on the contact list will have an associated contact name and contact information (e.g. a phone number, email address, IP address or a combination thereof). The contact name of contact 501 could be unpronounceable by a human voice when spoken literally. An example of such a contact name is the moniker "Chr1s", which will be used herein in relation to FIG. 5 for the purposes of illustration only. The contact list could be accessible by the user 502, for example by display on a graphical user interface of the user terminal.

The contact name of contact 501 is input in the form of a source input string 301 into a transform logic 203. The transform logic is configured to perform at least one transformation step on the input string. The transformation steps performed by the transform logic could include any and all of the operations described above. The output of the transform logic is transformed data 303. The transformed data 303 is a transformed version of the contact name that could be pronounceable by a human when spoken literally. For example, for the contact name "Chr1s", the transformed data could be the name "Chris".

The transformed data is input into a Grammar 202 so that the pronounceable name "Chris" is associated with the contact name "Chr1s".

In one embodiment, the contact names from contact list 106 could be input into the transform logic module automatically, that is to say, without user input. For example, the user may enter the details of a contact into the contact list 106. Upon entering the details, the contact name is input into the transform logic module. In an alternative embodiment, the contact names could be input into the transform logic module to be transformed into pronounceable names upon the request of the user. In yet another alternative embodiment, the user terminal could request permission from the user to transform the contact names of contact list 106 into pronounceable names. If the user refuses permission, names from the contact list are not input into the transform logic module 203.

Once a contact name has been transformed by logic module 203 and stored in the Grammar 202, the contact can be identified by the user 502 from a voice input 503. For example, the user may speak a command containing the word "Chris". An automatic speech recognition (ASR) engine 309 is configured to receive the voice input and to access the grammar 202. By accessing the grammar, the ASR engine can recognise the word "Chris" and determine that it is associated with the contact name "Chris". The ASR engine then outputs a command 504 to trigger an action associated with the contact name "Chr1s", such as triggering the user terminal to establish a communication event with the user's contact "Chr1s".

It will be understood that a transformation process may contain any number of the above steps. For a process containing more than one step, the input string is passed through each step sequentially, such that the output of one step is supplied as the input to the next step. In one embodiment, the transformation process comprises all of the operations described above. The steps may be performed in the order in which they are described, e.g. the first step is to replace accents, the second step (performed on the output of the first step) is to strip symbols, and so on.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. microprocessors, CPU or CPUs). The program code can be stored in one or more computer readable memory devices. The features of the techniques described below are platform-independent, meaning that the techniques may be implemented on a variety of commercial computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of identifying a contact in a communication system using voice input, the method comprising:
   receiving an input string of characters, the input string representing a contact and being normally unpronounceable by a human voice when spoken literally;
   displaying, on a user terminal, a message that the input string is going to be transformed into a pronounceable name for the contact;
   performing at least one transforming step using the user terminal to transform at least one character of the input string to thereby generate the pronounceable name for the contact, the at least one transforming step being based at least in part on a region of the contact and performing regional sanitization based on the region to allow for cultural differences in the input string of characters by modifying the input string of characters to remove patterns of complexity and ambiguous string components;
   returning a result including a number of character changes and a number of characters removed during the at least one transforming step; and
   outputting the pronounceable name for use in establishing a communication event with the contact using voice input.

2. A method as claimed in claim 1, wherein the input string is displayed to a user on a display of the user terminal.

3. A method as claimed in claim 1, wherein the pronounceable name is stored in a grammar accessible by a speech recognition engine, whereby voice input of a pronounced version of the input string to the speech recognition engine locates a match of the pronounceable name.

4. A method as claimed in claim 2, wherein the pronounceable name is outputted to the display and displayed in association with the input string.

5. A method as claimed in claim 2, wherein the pronounceable name is outputted to the display in editable form as an autosuggested replacement for the input string.

6. A method as claimed in claim 1 further comprising outputting a quality parameter indicating the quality of the relationship between the input string and the pronounceable name.

7. A method as claimed in claim 6 further comprising discarding pronounceable names below a quality threshold, using the quality parameter.

8. A method as claimed in claim 1 wherein the at least one transforming step comprises multiple transforming steps, the output of one step being supplied to a next step.

9. A method as claimed in claim 8, wherein the at least one transforming step comprises at least one of: replacing accents, stripping symbols, changing separators to whitespace, trimming leading/trailing numbers and symbols, replacing double vowel leet characters, replacing single vowel leet characters, stripping initials, normalising capitalisation, inserting whitespace in contiguous runs of characters between fragments distinguished by capitalisation, parsing suffixes and/or titles and/or nicknames and/or fullnames, and classifying said parsed suffixes and/or titles and parsing remaining characters of the input string into a first name and a fullname.

10. A method as claimed in claim 9, wherein the at least one transforming step comprises all of the transforming steps of claim 9.

11. A method as claimed in claim 1, wherein the input string representing the contact is written in "leet speak".

12. A method as claimed in claim 1, wherein performing the at least one transforming step is dependent upon the contact's locale and/or location.

13. A method as claimed in claim 6, wherein the at least one transforming step comprises multiple transforming steps, the output of one step being supplied to a next step and wherein the quality parameter is dependent upon a score for each step of the said multiple transforming steps.

14. A user device for identifying a contact in a communication system using voice input, the user device comprising a processor configured to execute code to:
   receive an input string of characters, the input string representing a contact and being normally unpronounceable by a human voice when spoken literally;
   display, on the user device, a message that the input string is going to be transformed into a pronounceable name for the contact;
   perform at least one transforming step using the user device to transform at least one character of the input string to thereby generate the pronounceable name for the contact, the at least one transforming step being based at least in part on a region of the contact and performing regional sanitization based on the region to allow for cultural differences in the input string of characters by modifying the input string of characters to remove patterns of complexity and ambiguous string components;
   display, on the user device, a message that the input string has been transformed into the pronounceable name; and
   output the pronounceable name for use in establishing a communication event with the contact using voice input.

15. A user device as claimed in claim 14, wherein the pronounceable name is stored in a grammar accessible by a speech recognition engine, whereby voice input of a pronounced version of the input string to the speech recognition engine locates a match of the pronounceable name.

16. A user device as claimed in claim 14, wherein the input string is displayed to a user of the user device.

17. A user device as claimed in claim 16, wherein the pronounceable name is outputted to the display and displayed in association with the input string.

18. A user device as claimed in claim 16, wherein the pronounceable name is outputted to the display in editable form as an autosuggested replacement for the input string.

19. A user device as claimed in claim 14, which, when executed on the processor of the user device, is further configured to output a quality parameter indicating the quality of the relationship between the input string and the pronounceable name and to discard pronounceable names below a quality threshold, using the quality parameter.

20. A user terminal configured to identify a contact in a communication system using voice input, the user terminal comprising:

an input configured to receive an input string of characters, the input string representing a contact and being normally unpronounceable by a human voice when spoken literally;

a display displaying a message that the input string is going to be transformed into a pronounceable name for the contact, the message providing an option for not proceeding with transforming the input string into the pronounceable name;

transform logic configured to perform at least one transforming step to transform at least one character of the input string to thereby generate the pronounceable name for the contact, the at least one transforming step being based at least in part on a region of the contact and performing regional sanitization based on the region to allow for cultural differences in the input string of characters by modifying the input string of characters to remove patterns of complexity and ambiguous string components;

an output configured to output the pronounceable name for use in establishing a communication event with the contact using voice input and output a quality parameter indicating the quality of the relationship between the input string and the pronounceable name; and a scoring module configured to discard pronounceable names below a quality threshold, using the quality parameter.

21. A user terminal as claimed in claim 20, wherein the input string of characters is received from a contact list stored on the user terminal.

* * * * *